US009529439B2

(12) United States Patent
Van Dyken et al.

(10) Patent No.: US 9,529,439 B2
(45) Date of Patent: Dec. 27, 2016

(54) MULTI DEVICE PAIRING AND SHARING VIA GESTURES

(71) Applicant: QUALCOMM Incorporated, San Diego, CA (US)

(72) Inventors: Shaun W. Van Dyken, San Diego, CA (US); Phuong L. Ton, San Diego, CA (US); Suzana Arellano, San Diego, CA (US); Evan Robert Hildreth, Thornhill (CA); Joel Bernarte, San Diego, CA (US); Guy Perry, San Diego, CA (US); Kirk S. Taylor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 13/843,700

(22) Filed: Mar. 15, 2013

(65) Prior Publication Data

US 2014/0149859 A1 May 29, 2014

Related U.S. Application Data

(60) Provisional application No. 61/730,438, filed on Nov. 27, 2012, provisional application No. 61/745,272, filed on Dec. 21, 2012.

(51) Int. Cl.
*G06F 3/01* (2006.01)
*H04L 29/08* (2006.01)
*H04W 4/00* (2009.01)
*H04W 4/20* (2009.01)

(52) U.S. Cl.
CPC ......... *G06F 3/017* (2013.01); *H04L 29/08117* (2013.01); *H04W 4/001* (2013.01); *H04W 4/206* (2013.01)

(58) Field of Classification Search
CPC ............................ G06F 3/017; G06F 3/04883
See application file for complete search history.

(56) References Cited

U.S. PATENT DOCUMENTS

| 8,260,883 | B2 | 9/2012 | Mooring et al. | |
|---|---|---|---|---|
| 2004/0267944 | A1* | 12/2004 | Britt, Jr. ................. | H04L 29/06 709/229 |
| 2005/0093868 | A1* | 5/2005 | Hinckley ................ | G06F 3/011 345/502 |

(Continued)

OTHER PUBLICATIONS

International Search Report and Written Opinion—PCT/US2013/071812—ISA/EPO—May 8, 2014.

(Continued)

*Primary Examiner* — William Bashore
*Assistant Examiner* — Rayeez Chowdhury
(74) *Attorney, Agent, or Firm* — Kilpatrick Townsend & Stockton LLP

(57) ABSTRACT

Embodiments of the present disclosure relate to multi device pairing and sharing via non-touch gestures. In an embodiment, a method comprises detecting, by a parent device, an initiating non-touch gesture performed by a user towards the parent device. The method also comprises initiating an action based on the detecting. The method further comprises triggering, by the parent device, a gesture recognition mode on one or more secondary devices based on the detecting. And the method further comprises completing the action upon a positive gesture recognition by the one or more secondary devices.

62 Claims, 11 Drawing Sheets

Dealing cards from one device to several

(56) References Cited

U.S. PATENT DOCUMENTS

| | | | | |
|---|---|---|---|---|
| 2007/0124503 | A1* | 5/2007 | Ramos | G06F 3/017 709/248 |
| 2007/0144723 | A1* | 6/2007 | Aubertin | B60H 1/00642 165/202 |
| 2007/0242056 | A1* | 10/2007 | Engelhardt | G06F 3/0416 345/173 |
| 2007/0274233 | A1* | 11/2007 | Ptashek | H04L 67/16 370/254 |
| 2008/0122796 | A1* | 5/2008 | Jobs | G06F 3/0488 345/173 |
| 2009/0219255 | A1* | 9/2009 | Woolley | G06F 3/0416 345/173 |
| 2010/0257447 | A1* | 10/2010 | Kim | G06F 3/04883 715/702 |
| 2011/0037712 | A1* | 2/2011 | Kim | H04M 1/7253 345/173 |
| 2011/0175822 | A1* | 7/2011 | Poon | G06F 3/04842 345/173 |
| 2011/0191823 | A1 | 8/2011 | Huibers | |
| 2011/0283334 | A1* | 11/2011 | Choi | G06F 3/04883 725/148 |
| 2012/0081282 | A1* | 4/2012 | Chin | G06F 3/011 345/156 |
| 2012/0083208 | A1 | 4/2012 | Giles et al. | |
| 2012/0198353 | A1 | 8/2012 | Lee et al. | |
| 2012/0289227 | A1 | 11/2012 | Dhodapkar | |
| 2012/0324368 | A1 | 12/2012 | Putz et al. | |
| 2013/0328770 | A1* | 12/2013 | Parham | G06F 3/0304 345/157 |
| 2014/0229858 | A1* | 8/2014 | Bleker | G06F 3/017 715/753 |

OTHER PUBLICATIONS

Shiratuddin M. F., et al., "Non-Contact Multi-Hand Gestures Interaction Techniques for Architectural Design in a Virtual Environment", Proceedings of the 5$^{th}$ International Conference on IT & Multimedia at UNITEN (ICIMU 2011), Nov. 14, 2011 (Nov. 14, 2011), pp. 1-6.

* cited by examiner

Dealing cards from one device to several

Moving map from PC to phone

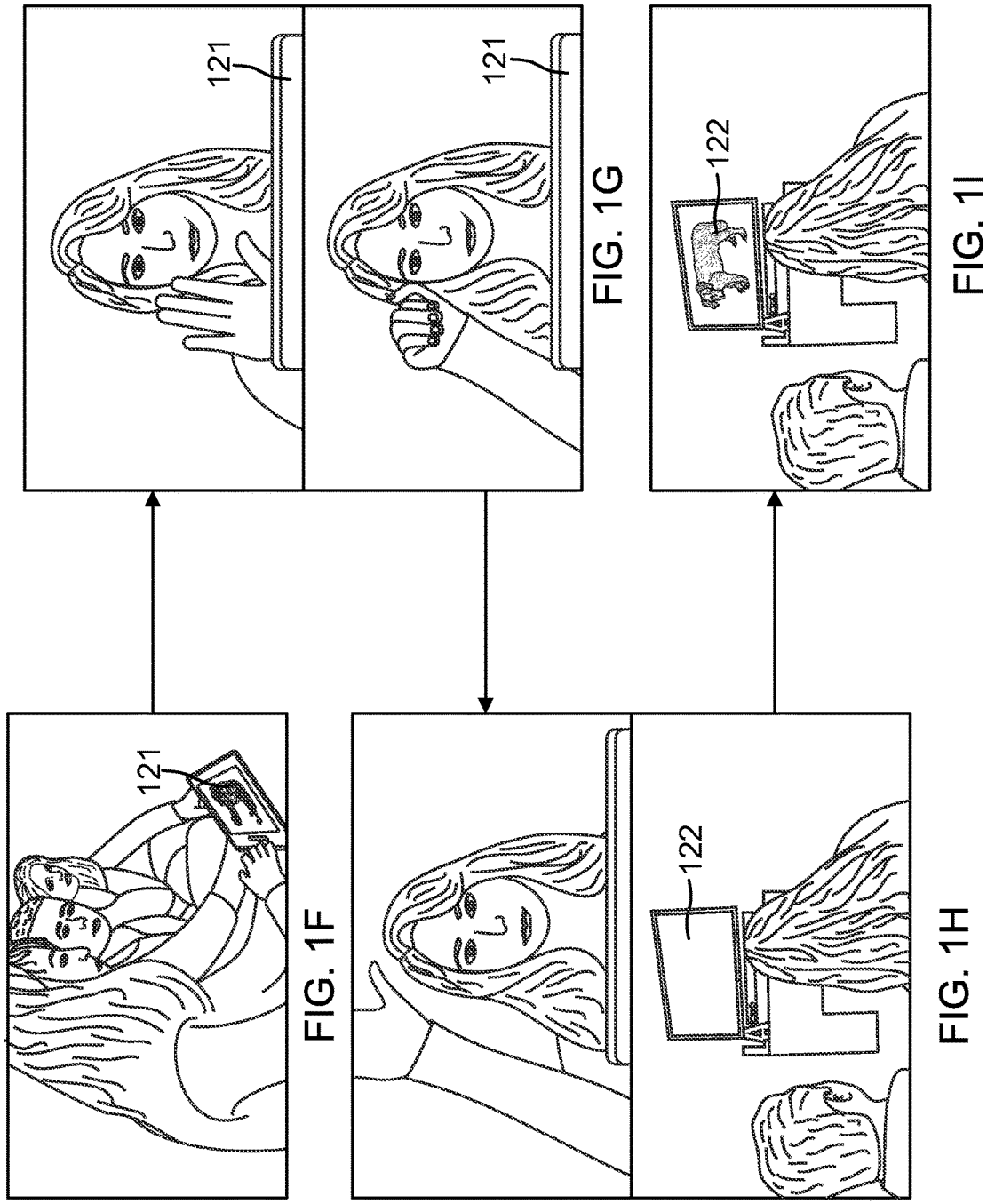

MULTI DEVICE PAIRING AND SHARING VIA GESTURES

RELATED APPLICATIONS

The present application claims priority to U.S. Provisional Patent Application Ser. No. 61/730,438, which is entitled "MULTI DEVICE PAIRING AND SHARING VIA GESTURES" and was filed on Nov. 27, 2012, and to U.S. Provisional Patent Application Ser. No. 61/745,272, which is entitled "MULTI DEVICE PAIRING AND SHARING VIA GESTURES" and was filed on Dec. 21, 2012. The contents of both of these applications are herein incorporated by reference in their entireties.

TECHNICAL FIELD

The present disclosure generally relates to device pairing and sharing, and more particularly, to multi device pairing and sharing via non-touch gestures or interactions.

BACKGROUND

The number of pairing devices in a location such as a residence or a place of business has grown rapidly. For pairing of the devices, current technologies include, for example, a Bump application, Bluetooth, NFC, WiFi, Direct, and the like. Also, in current technologies, a dedicated pair of pairing devices may be created through a menu setup, for example, iPad™ with Apple™ TV.

However, because of the growing number of pairing devices, it is generally difficult to select a device for pairing. Also, it is generally difficult to select content for sharing. Content is also generally difficult to share between devices. For example, playing a shared game may often require a login or set up.

Thus, there is a need in the art for improved device pairing and sharing.

SUMMARY

According to one or more embodiments of the present disclosure, multi device non-touch gestures or interactions may be used for device pairing and sharing.

In an embodiment, an action (e.g. for moving or sharing content) may be implemented from one device to one or many other devices. The action may be initiated via non-touch gestures or interactions to a first or parent device. The action may be completed via non-touch gestures or interactions to a second device or to any available devices. It should be appreciated that the term "gestures" may hereinafter refer to non-touch gestures or interactions, which may include, for example, non-touch hand poses or gestures. As such, in embodiments herein, non-touch multi device pairing/sharing may include detecting or recognizing a user's interactive input such as a hand pose.

For example, an action initiated by a source or parent device may alert one or more secondary devices to turn on gesture detection mode, change a gesture detection mode or algorithm, and/or analyze information to detect a corresponding gesture. The source or parent device may listen for a notification, for example indicating that a corresponding gesture has been detected, from a secondary device to which content is then moved or copied. In another example, simultaneous multi-device sharing may be done with a key code such as a "secret handshake" or secret gesture pose. In yet another example, when a parent device triggers gesture recognition mode on one or more secondary devices, and there is positive gesture recognition on one of the secondary devices, then gesture recognition on all other secondary devices may be deactivated either immediately or after a specified time "t".

According to one or more embodiments of the present disclosure, a method of processing information may be provided. In that regard, the method may include receiving a message indicating that a source device detected a transfer initiation non-touch gesture. The method may also include determining that a transfer completion non-touch gesture is detected, and the method may also include processing the received information based at least in part on determining that the transfer completion non-touch gesture is detected.

In an embodiment, the method may further include receiving first information from the source device and caching the first information, wherein the received information comprises at least the first information.

In another embodiment, the method may further include transmitting a message to the source device indicating that the transfer completion non-touch gesture is detected and receiving first information from the source device in response to the transmitting the message, wherein the received information comprises at least the first information. In one embodiment, the message may indicate one or more capabilities of a device transmitting the message. In another embodiment, the first information is based at least in part on the one or more capabilities.

In yet another embodiment, the first information comprises a plurality of elements that were in the process of being sequentially presented on the source device when the transfer initiation non-touch gesture was detected at the source device, wherein the method further comprises receiving an indicator indicating an element that was being presented when the transfer initiation non-touch gesture was detected at the source device, and wherein the processing comprises sequentially presenting elements of the plurality of elements remaining after the indicated element.

In another embodiment, the method may further include transmitting a message to one or more other devices to alert the other devices that they will not be recipients of a transfer.

In another embodiment, the method may further include determining that the transfer completion non-touch gesture was detected at approximately the same time as the transfer initiation gesture or within a threshold amount of time.

In another embodiment, the method may further include activating a gesture recognition procedure or mode in response to the receiving.

In another embodiment, the method may further include altering a gesture recognition mode or algorithm based on the receiving.

In another embodiment, the transfer completion non-touch gesture is substantially the same as the transfer initiation non-touch gesture.

In another embodiment, the transfer initiation non-touch gesture may comprise one or more gestures in a series of gestures, wherein the transfer completion non-touch gesture comprises a next gesture in the series of gestures.

In another embodiment, the transfer initiation non-touch gesture is a first gesture of a pair of gestures, wherein the transfer completion non-touch gesture comprises a second gesture of the pair of gestures. In one embodiment, the first gesture comprises a grab gesture and the second gesture comprises a drop gesture. In another embodiment, the transfer initiation non-touch gesture or the transfer completion non-touch gesture comprises a hand pose.

In another embodiment, the method may further include determining that a user performing the transfer completion non-touch gesture is gazing at a device performing the method, wherein the processing is performed in response to the determining that the user is gazing at the device.

In another embodiment, the processing comprises displaying the information.

In another embodiment, the determining comprises detecting a hand performing the transfer completion non-touch gesture based on information from a camera associated with a device performing the method.

In another embodiment, the determining comprises detecting a hand performing the transfer completion non-touch gesture based on information from a microphone which is sensitive to ultrasonic frequencies and is associated with a device performing the method.

According to one or more embodiments of the present disclosure, a method of transmitting information may be provided. In that regard, the method may include detecting a transfer initiation non-touch gesture. The method may also include, in response to the detecting, transmitting a message to one or more secondary devices indicating that the transfer initiation non-touch gesture was detected. And the method may also include transmitting information to at least one device of the one or more secondary devices.

In another embodiment, the method may further include receiving a message indicating that a transfer completion non-touch gesture was detected at the at least one device, wherein the transmitting the information is performed in response to the receiving.

In yet another embodiment, the method may further include de-multiplexing content for transmission into one or more data streams, wherein the transmitted information comprises at least one data stream of the one or more data streams. In one embodiment, the de-multiplexing may be based on a capability of the one or more secondary devices.

In another embodiment, the method may further include transmitting a message to the one or more secondary devices which are not the at least one device to alert them that they will not be recipients of a transfer.

In another embodiment, the message is received in response to the transmitting the message.

In another embodiment, the method may further include determining that the transfer completion non-touch gesture was detected at approximately the same time as the transfer initiation non-touch gesture or within a threshold amount of time, wherein the transmitting the information is performed in response to the determining.

In another embodiment, the information is transmitted with the message.

In another embodiment, the method may further comprise receiving an acknowledgment of the at least one device receiving the information. In one embodiment, the method may further comprise determining that the acknowledgement has not been received within a threshold amount of time and retransmitting the information to the at least one device until the acknowledgement is received.

In another embodiment, the transmitting the message comprises broadcasting the message.

In another embodiment, the transmitting the message comprises sending the message to one or more predetermined groups, wherein the one or more predetermined groups comprise the one or more secondary devices. In one embodiment, the one or more predetermined groups are defined based on a social network of a user. In another embodiment, the one or more predetermined groups are selected based on the transfer initiation non-touch gesture.

In another embodiment, the method may further include causing content to be displayed on a device performing the method, wherein the content is displayed when the transfer initiation non-touch gesture is detected, and wherein the transmitting comprises transmitting at least a portion of the displayed content to the at least one device.

BRIEF DESCRIPTION OF THE DRAWINGS

FIGS. 1F-1I illustrate a flow for a use case according to yet another embodiment of the present disclosure.

DETAILED DESCRIPTION

Figure 1:
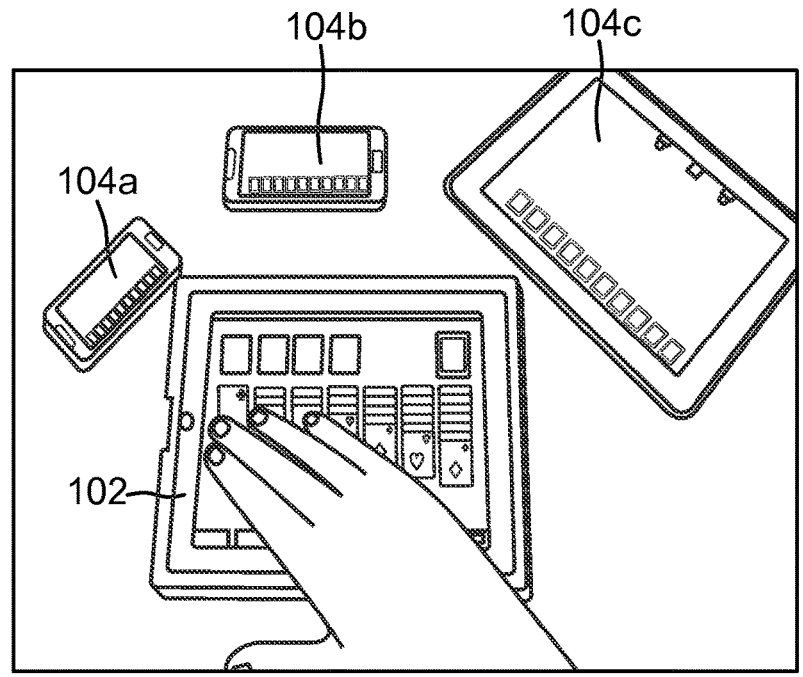
FIG. 1 illustrates a use case according to an embodiment of the present disclosure.

Systems and methods for device pairing and sharing using multi device gestures are provided according to one or more embodiments of the present disclosure.

In embodiments herein, the devices may include mobile devices, tablets, laptops, PCs, televisions, speakers, printers, gameboxes, etc. In general, pairing devices may include or be a part of any device that includes gesture recognition, for example, via image or video capturing components such as a camera (e.g., a visible-light camera, a range imaging camera such as a time-of-flight camera, structured light camera, stereo camera, or the like), IR, ultrasound input, etc. As such, in some embodiments, the devices may have vision-based gesture capabilities wherein vision-based gestures may use cameras or other image tracking technologies to capture a user's gestures without touching a device (i.e., non-touch gestures such as a hand pose in front of a camera). Certain of the embodiments may also be used to implement actions such as transfer content or share information with one or more devices that traditionally lack a user interface such as a screen, for example, a speaker, a printer, or the like. The devices may be able to communicate through protocols such as AllJoyn, WiFi direct, WiFi display, Miracast, or other appropriate sharing/pairing protocols or technologies. Furthermore, the devices may communicate over a network such as a wireless network, for example a WiFi network, Bluetooth, NFC, RFID, or the like.

In an embodiment, an action (e.g. for moving or sharing content, pairing devices, etc.) may be implemented from one source or parent device to one or more receiving or secondary devices. In that regard, the action, e.g., multi device sharing, may be accomplished with predefined gestures. In various embodiments, the action (e.g., moving or sharing of content) may be initiated in a secondary device having gesture recognition including image or video image capturing components (e.g., a camera) configured to capture non-touch gestures in front of the image or video image capturing components so that a touch free way of communicating may be implemented.

The action may be initiated via an engagement or "grab" gesture or pose by a user to the source or parent device. Gestures may include, for example, a hand sign such as an open or closed hand, a hand peace sign, or a gesture key code, for example, a "secret handshake" such as rock-paper, etc. The parent device may alert all devices available for pairing to enable gesture recognition, change a gesture detection mode or algorithm, and/or analyze information to detect a corresponding gesture, for example to look for detection of a "drop" gesture via an applicable communication protocol. Gesture recognition may be initiated or implemented on nearby receiving devices available for pairing. The action may be completed (e.g. content moved or transferred) via an engagement or "drop" gesture to any or every other available receiving device.

In various embodiments, a predefined gesture may include a gesture key code, for example, a secret gesture pose (e.g., a hang lose symbol, a hand peace sign symbol, etc.) that is a unique identifier only known to a recipient user of a receiving device. Users of the receiving or secondary devices may perform a pre-defined gesture, for example with a corresponding key code, over their respective devices. Such pre-defined gestures may include, for example, a grab, cover, use of the same "secret handshake", secret gesture pose, or a partner to the "secret handshake" (e.g., scissors). Upon performing the pre-defined gesture, the users may receive the content on their respective devices. According to one or more embodiments, unique identifiers that are dynamic may be established, for example, a secret corresponding gesture may be changed. In this regard, a handshake may involve a dynamic sequence that may be changed.

In another embodiment, a parent device may trigger gesture recognition mode on one or more secondary devices. The secondary device to first detect a "drop" gesture may become the target device via alerting the parent device. The parent device may then alert all other devices available for pairing, except the target device, to turn off gesture recognition. That is, positive gesture recognition on a secondary device may deactivate gesture recognition on other secondary devices either immediately or after a specified time "t", for example, about 2 seconds In one or more embodiments, if no gesture detection is made on any secondary device for some amount of time "t" (timeout), or if the parent device detects a cancel gesture, the parent device may alert all secondary devices to turn off gesture detection. The parent device completes the action (e.g., transfer of content) to the target device.

In an embodiment for pairing or sharing time-line based or streaming content, for example, sharing video, music, or the like, a user of the parent device may perform a "grab" gesture over the parent device such that when the "grab" gesture is detected, the streaming content is paused on the parent device. For example, the "grab" gesture may comprise an open hand closing to make a fist. In some embodiments, the "grab" gesture may also include a movement of the hand toward the user. When the user performs a "drop" gesture to a secondary device, which becomes the target device, the streaming content may be displayed on the target device and continues to stream or play from where it was last paused on the parent device. For example, the "drop" gesture may comprise a closed first opening into an extended hand. In some embodiments, the "drop" gesture may also include a movement of the hand toward the target device. As such, the parent device may send information about the content and additional information, including its current state. In some embodiments, this information is included in the metadata. For example, in a time-line based media or streaming content in transmission data, the parent device may include in the metadata the timestamp or other progress indicator where the content was paused on the parent device (e.g., the content was paused at 15 minutes into playback), and the secondary device may pause or continue to stream from that point.

Gesture recognition may remain on for the duration of a task or action, for example, for a short duration for sharing, or for a long duration for games, etc. Advantageously, content sharing becomes fun and easy. An easy and natural selection between devices available for pairing is facilitated, and there may be a very short duration of gesture detection on non-primary or secondary devices.

Embodiments of the present disclosure may apply to many user experiences or use cases including for example, content sharing from one user device to many devices such as photo sharing, streaming content sharing such as video sharing; card games, and many other uses as may be determined by the creativity implemented on the devices.

Use Case: Photo Sharing, One to Many

In one embodiment, photo sharing may be implemented from one device to many devices. A user 1 may take a photo with a device 1. The user 1 initiates photo sharing on the device 1, for example, via performing a gesture over the device 1. Gestures may include, for example, a flick, or a "secret handshake" such as rock-paper, etc. Users 2 through X may perform a pre-defined gesture over their respective devices. Such pre-defined gestures may include, for example, a grab, cover, use of the same "secret handshake" or gesture or a partner to the "secret handshake" (e.g., scissors). Upon performing the pre-defined gesture, Users 2 through X may receive the photo on their devices.

Use Case: Card Game

In another embodiment, for example as illustrated in FIG. 1, a use case may involve dealing cards from one device, for example parent device 102, to several secondary devices, for example secondary devices 104a-104c. User 1 is the dealer for a card game. User 1 may deal cards via "flicking" cards at each player. Each player "catches" their cards. Alternatively, User 1 uses a specific gesture per player. For example, User 1 may flick with one finger, or flick with 2 fingers, etc. for each respective player. Each player may grab his or her cards with his or her gestures or a partner of the gestures, for example, grab with one finger, grab with 2 fingers, etc.

Use case: Move Map from Laptop to Phone

Figure 1A:
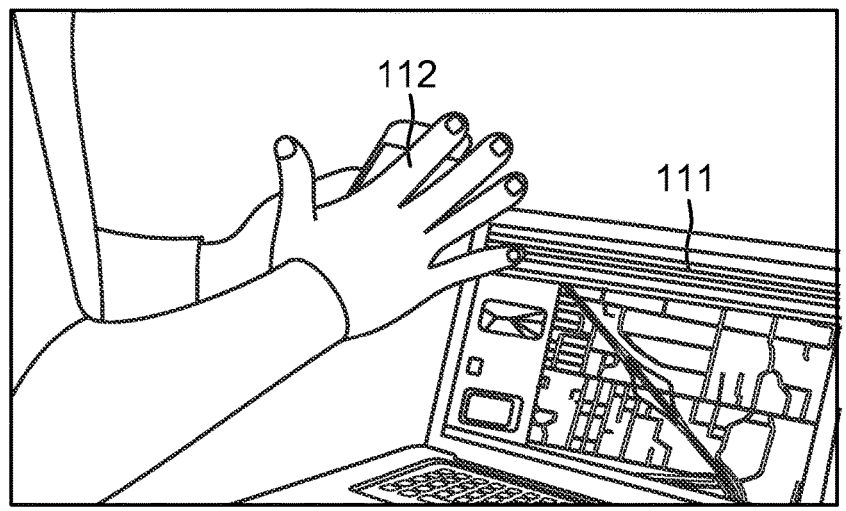
FIG. 1A illustrates a use case according to another embodiment of the present disclosure.

In another embodiment, for example as illustrated in FIG. 1A, a use case may involve moving content from one device to another. For example, a map may be moved from a parent device 111 (e.g., PC or laptop) to a target device 112 (e.g., mobile phone).

In that regard, in embodiments where content is based on an image such as a map, a photo, a 3D model, or the like, the parent device may send transmission data including, for example, an indicator indicating a position and view (e.g., pan, zoom level, etc.) of the image as it is displayed on the parent device (e.g. parent device 111) when the image is moved from the parent device to the target device (e.g., target device 112) such that the target device may display the image based upon the received data including the position and view.

To accomplish moving a map (or any content) from one device to another, for example, as illustrated in the embodiment of FIG. 1A, the following Table 1 outlines the User Actions and System Response Functions that may occur for this use case. FIGS. 1B-1E illustrate the corresponding blocks of Table 1.

TABLE 1

Figure 1B:
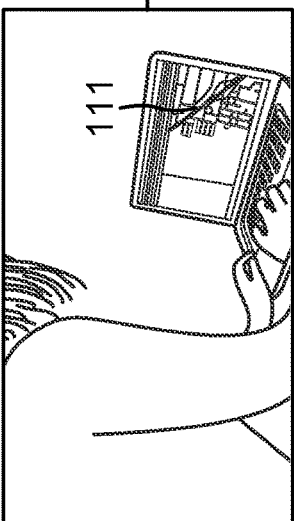
FIGS. 1B-1E illustrate a flow for the use case illustrated in the embodiment of FIG. 1A according to an embodiment of the present disclosure.
Figure 1C:
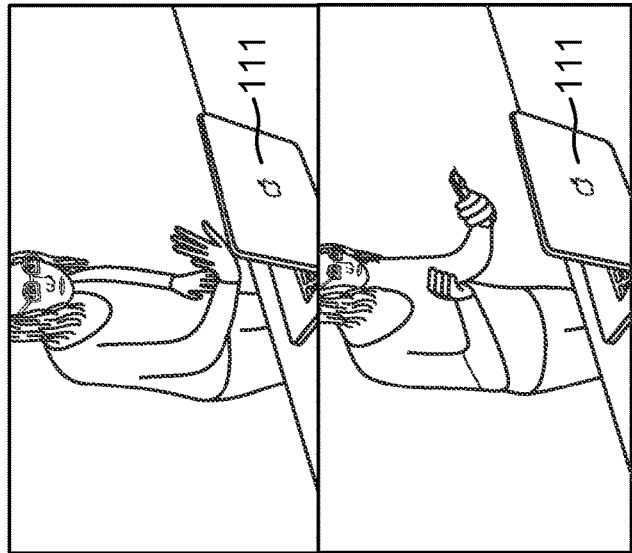
Figure 1D:
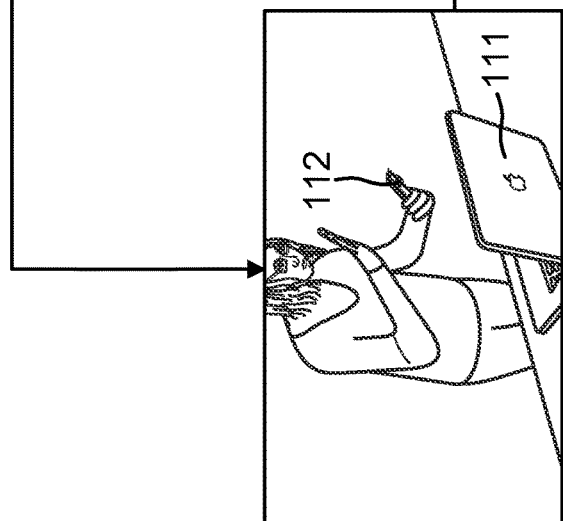
Figure 1E:
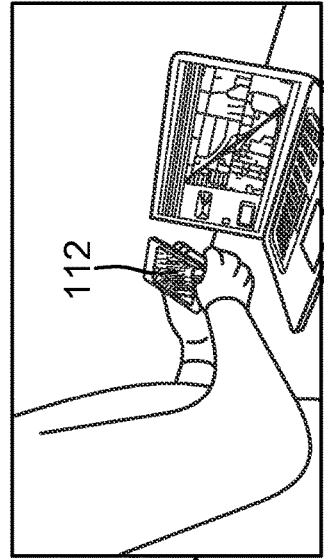

| User Actions | System Response Function |
|---|---|
| 1. FIG. 1B illustrates that a user on a parent device 111, such as a laptop, (Device 1) may locate and select a map area, e.g. in a browser. | Map screen shown on parent device 111 (e.g., laptop). |
| 2. FIG. 1C illustrates that the user may perform an engagement gesture or transfer initiation gesture, such as a grab gesture, for detection by the parent device 111, e.g. presenting an open hand facing the laptop screen/camera, holding open hand position for about 1-3 seconds and then closing the hand. | Gesture recognition mode on parent device 111 (e.g., laptop) recognizes gesture. User Interface (UI) element on laptop indicating the transfer initiation gesture was detected: e.g. Sound notification, flash of screen, animation of content shrinking, floating, etc. Laptop alerts all devices available for pairing to enable gesture recognition, and look for detection of corresponding transfer completion gesture, such as a "drop" gesture. E.g. via AllJoyn. Gesture recognition is initiated or otherwise performed on nearby devices available for pairing (e.g., phones, tablets, PCs, TVs, gameboxes, or the like). Alternatively: parent device 111 (e.g., laptop) sends out content with the alert so receiving devices can pre-cache content while waiting for "drop" conformation. |
| 3. FIG. 1D illustrates that the user may complete the transfer by performing an engagement or transfer completion gesture, such as a "drop" gesture, for detection by the desired target device 112. E.g., by opening a closed hand in front of the target device 112, e.g., the phone screen. | The first device (e.g. Phone) to detect the transfer completion gesture may become the target device 112 via alerting the parent device 111 (e.g. laptop). Parent device may alert all other devices available for pairing except target device 112 to turn off gesture recognition or that the other devices will not be the recipients of the transfer content. In some embodiments, the target device 112 alerts the other devices in addition or instead. In some embodiments, such alert may be omitted, for example when more than one device may be the recipient of the transfer content. In other embodiments, the parent device may detect a cancel gesture that may be performed to deactivate gesture recognition mode on all secondary devices. In some embodiments, if no gesture detection is made on any secondary device after some time has passed (a timeout), the parent device may alert the secondary devices to deactiveate gesture recognition. Parent device initiates the transfer of content to the target device 112. (e.g. URL or file) In this embodiment, map is transferred to target device 112 (phone) screen, for example which displays it as soon as it is available. Alternatively: The pre-cached content is displayed on the target device 112 once the target device 112 detects the transfer completion gesture, alerts the parent device 111 of the detection, and/or receives confirmation from the parent device 111. |
| 4. FIG. 1E illustrates that a user may view | Target device 112 displays the received content, e.g., the map. |

TABLE 1-continued

| User Actions | System Response Function |
|---|---|
| content on target device 112 (Phone) | |

Use Case: Move Video from Tablet to TV

In yet another embodiment, a use case may involve moving video from a tablet to a TV.

To accomplish moving the video from a tablet to a TV, the following Table 2 outlines the User Actions and System Response Functions that may occur for this use case. FIGS. 1F-1I illustrates the corresponding blocks of Table 2.

TABLE 2

| User Actions | System Response Function |
|---|---|
| 1. In FIG. 1F, a user locates and selects video (or other content) on parent device 121 (e.g., tablet). | Video starts playing on parent device 121 (e.g., tablet). In some embodiments, the video may be transferred without first being played. |
| 2. In FIG. 1G, the user performs a transfer initiation gesture for detection by the parent device 121, e.g. by placing an open hand and holding the open hand position for about 1-3 seconds and then closing the hand. | Same as for user case illustrated above in FIGS. 1A-1E: Moving Map content, except that when grab is detected, Video may be paused on the parent device 121 (e.g., tablet). |
| 5. In FIG. 1H, the user completes the gesture by performing a transfer completion gesture, for example holding out an open hand, for detection by a target device 122, i.e., a TV screen. In some embodiments, the user also looks at the target device 122. | Same as for use case illustrated above in FIGS. 1A-1E: Moving Map content, except: Video may be received and/or displayed on the target device 122 (TV) and it may continue to play from where it was last paused on the parent device 121 (Tablet). In some embodiments, a device determines that the user is looking or gazing at it before determining that it is the target device. |
| 6. In FIG. 1I, user watches video on target device 122 (TV). | |

In general, as described above, a device may use various technologies such as image or video capturing technologies, e.g., cameras, to capture a user's gestures without touching a device. In various embodiments, cameras may include visible-light cameras, range imaging cameras such as time-of-flight cameras, structured light cameras, stereo cameras, or the like. As described above, a device may use other technologies such as IR, ultrasound, UV, EM radiation, etc. to detect a gesture. In some embodiments, the gesture is a gesture performed without touching a device. In that regard, a device may use an image or video capturing component such as a camera to capture non-touch gestures so that an action such as a transfer of content may be initiated. For example, in some embodiments, a device may detect or capture a user's non-touch gesture which was performed with an object such as a hand (e.g., open hand, closed hand, etc.) held in a pre-defined pose in front of a device camera to transfer data going through an interface. No special application or user interface may be required as non-touch gestures may be captured or detected on any interface such as in front of or in the line of sight of a camera or other gesture capturing technology in some embodiments in order to share content in an application or a back-up server. In some embodiments, a non-touch gesture comprises a gesture performed while holding a gesture detection device. For example, one or more of an accelerometer, gyroscope, and/or magnetometer may be used to determine a movement of a device.

An example of a basic process for vision-based gesture recognition may include: a) A device captures an image; b) computer vision software identifies the hand/arm/body or other control object in the image; c) gesture-recognition module, for example as implemented in software and/or hardware, analyzes the hand/arm/body or other control object posture or pose or movement; d) module then compares the gesture to a gesture catalogued in a database or encoded in a model, for example; and e) the device takes the appropriate action.

Advantageously, vision-based gesture recognition may be beneficial in many scenarios because for example, it is nonintrusive, sensing is passive and silent, it is useful when touch is not practical, it increases immersive user experiences and usability for some tasks, it is useful for elderly users or users with disabilities, its related hardware may be commercially available at low cost, gestures may be more natural than other input techniques, and/or the size of an interaction area may be increased, for example.

Sharing or pairing connections may be made with technologies such as WiFi direct, AllJoyn, WiFi display or any other technology or sharing/pairing connection or protocol. In other embodiments, connections may be made using technologies including a wireless network such as a WiFi network, Bluetooth, NFC, RFID, etc.

Pairing devices may be any device that includes gesture recognition, for example, via a camera (e.g., a visible-light camera, a range imaging camera such as a time-of-flight camera, structured light camera, stereo camera, or the like), IR, ultrasound input, etc. For destination devices, no screen may be needed. In various embodiments, destination or receiving devices may only need a form of output device, for example, speakers, haptic feedback, a printer, etc. In one example, a user may grab a song off his or her smart phone and drop it on a speaker. In some embodiments, a user may grab a telephone call or other audio content and drop it onto a speakerphone, phone headset, and/or a wireless headset or headphones. Such devices may detect the drop gesture using a camera, IR, ultrasound, proximity sensor, ALS, and/or another element or component, for example.

Content that may be shared may include, for example, a link (e.g., a URL, a file location, etc.), a file (e.g., a photo, map data, any app data, or the like), streamed content (e.g., a video, a song being played, etc.), or any other appropriate content. In some embodiments, after a link or file location, etc. is shared, the target device may download or obtain further content from the link or location. Thus, the further content may be directly accessed by the target device in some embodiments rather than passing through the parent device. In some embodiments, content may be shared by streaming (e.g., a video, a song being played, etc.) content and/or information through the parent device. The parent device may de-multiplex data streams of the content (e.g., separating an audio data stream and video data stream), select a data stream (e.g., audio or video) based upon capabilities of the target device, and/or stream only the selected data stream to the target device in some embodiments. In some such embodiments, the target device may include one or more capabilities in a message to the parent device confirming that a transfer completion gesture was detected. In some embodiments, the capabilities are known a priori by the parent device. The parent device may down-sample, downmix, and/or transcode content (e.g., decode/decompress the content, and re-encode/re-compress the data in a format or resolution based on one or more capabilities of the target device). For example, the parent device may de-multiplex an audio data stream from a video, decompress the audio data, downmix the audio from five (surround sound) channels to two (stereo) channels, re-compress the downmixed audio data, and stream the re-compressed downmixed audio data to a stereo speaker. Thus, in some embodiments, a user (or plurality of users) may indicate content to be shared or transmitted—for example by performing a transfer initiation gesture with respect to a parent device and a transfer completion gesture with respect to a target device—and the content may thereafter be appropriately shared without additional interaction or instruction from the user. Determination of whether a link or streaming content is shared and/or which data stream to transmit may therefore be automated, for example based on one or more capabilities of the target device, network congestion, a data plan of a user, etc. In some embodiments, the user may select which data streams to share or may select one or more configuration parameters for sharing information. For example, the user may select one or more sharing options on a touchscreen of the parent device, or the user may indicate how to share certain content using one or more gestures. In one embodiment, a transfer initiation gesture performed with one hand indicates a number of data streams to share, and a transfer initiation gesture performed with two hands indicates a different number of data streams to share (e.g., just video or just audio, as opposed to video and audio).

Referring to FIGS. 2a-d, diagrams illustrate implementing of gesture recognition according to an embodiment of the present disclosure.

Figure 2A:
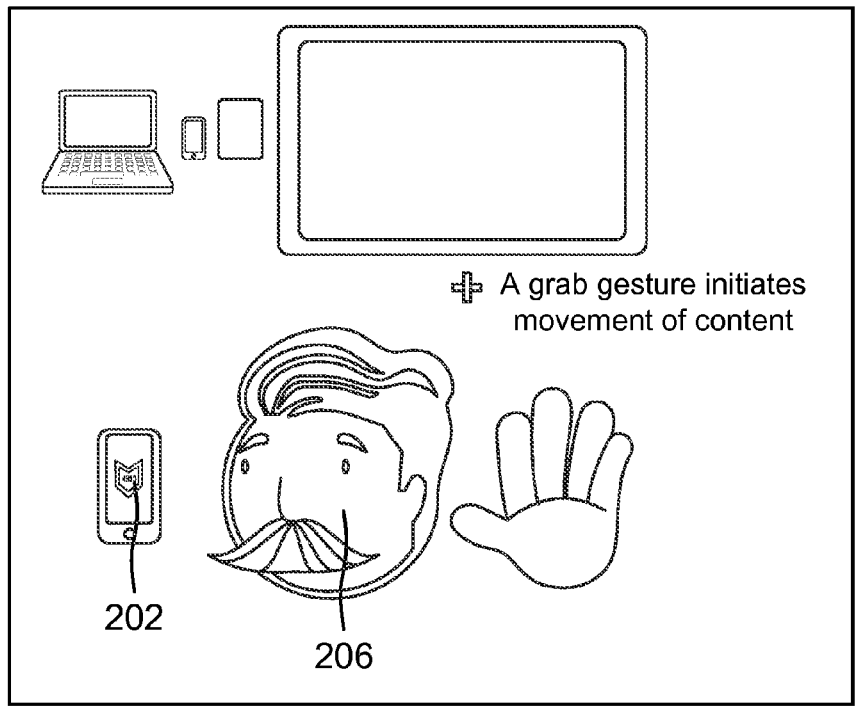
FIGS. 2a-d illustrate a flow for implementing gesture recognition according to an embodiment of the present disclosure.

In FIG. 2a, a user 206 may have desired content on his or her user device (parent device 202, also referred to as "Device 1"). User 206 may initiate a gesture, for example, a grab gesture as illustrated by an open hand motion to initiate the grab gesture.

Figure 2B:
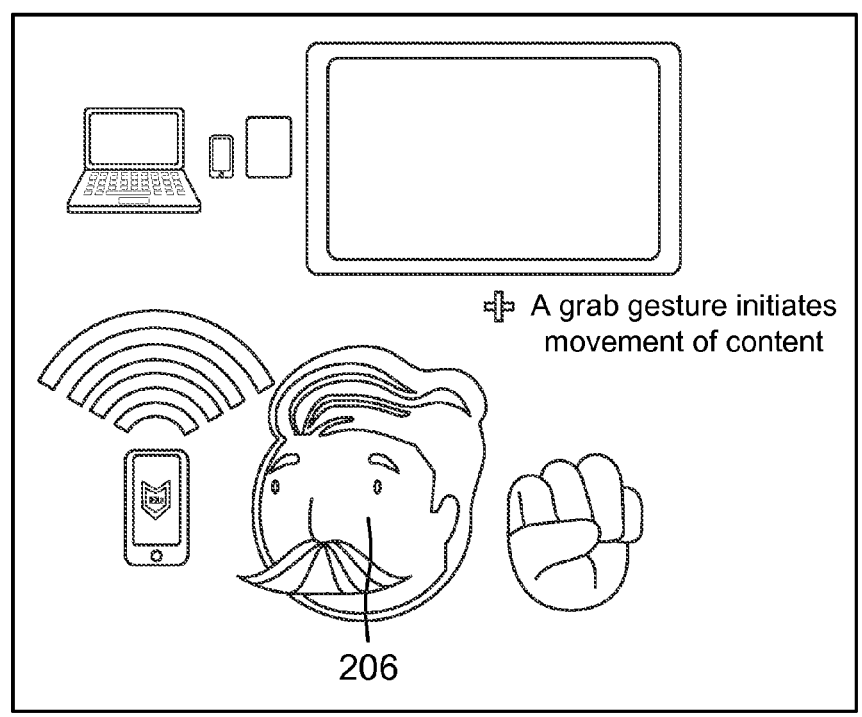

In FIG. 2b, user 206 completes the grab gesture, for example, as illustrated by a closed hand. The completion of the gesture may be the initiation of a move sequence for moving or copying the desired content. The initiation of the move sequence may commence when the gesture illustrated in FIG. 2a (to initiate the gesture) is held for a certain time "t" (e.g., about 2-3 seconds). The completion of the gesture may be for the user's ending of the grab gesture.

Device 1 may or may not give feedback to the user that the move has been initiated. If feedback is given, the feedback may be in any form, for example, a sound, a flash of the screen, an animation such as a visual shrinking of the displayed content, a vibration, a text note, or any other appropriate form.

Device 1 may send out a request to all devices available for pairing, for example instructing them to turn on their gesture recognition and look for a "drop" gesture.

Content may or may not start transmission from Device 1 at this time for pre-caching on all pairable devices.

If the content is streaming content or time-line based (e.g., video, music, etc.) the content may be paused on Device 1 and the time-stamp of the pause may be included in the transition data.

Figure 2C:
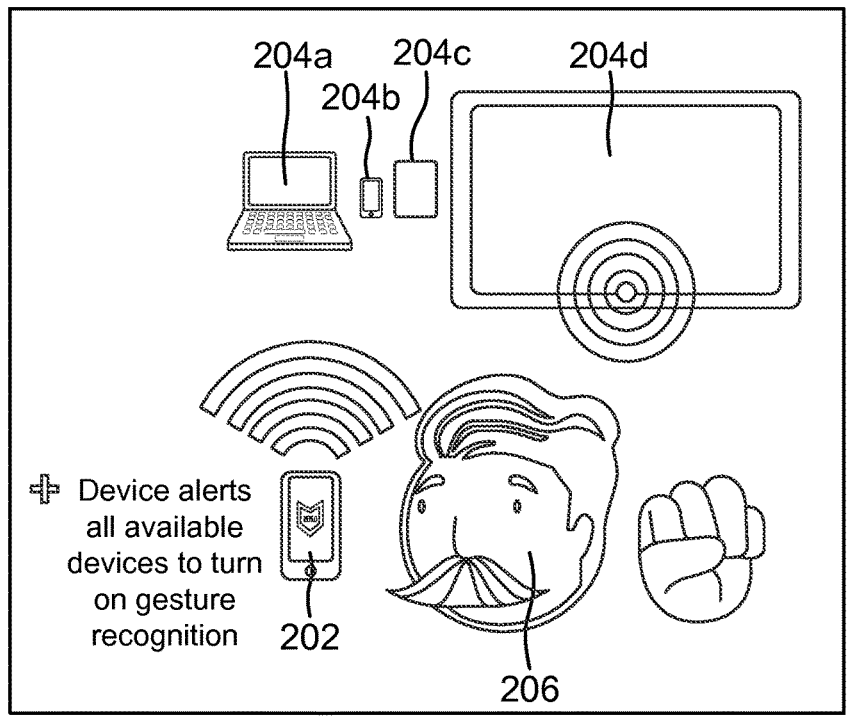

In FIG. 2c, parent device 202 may alert all available devices, for example secondary devices 204a-204d, to turn on their gesture recognition and/or to watch for a catch or "drop" gesture. Parent device 202 and secondary devices 204 a-d may each be a laptop, a mobile device, a tablet, a television, a speaker, etc.

Figure 2D:
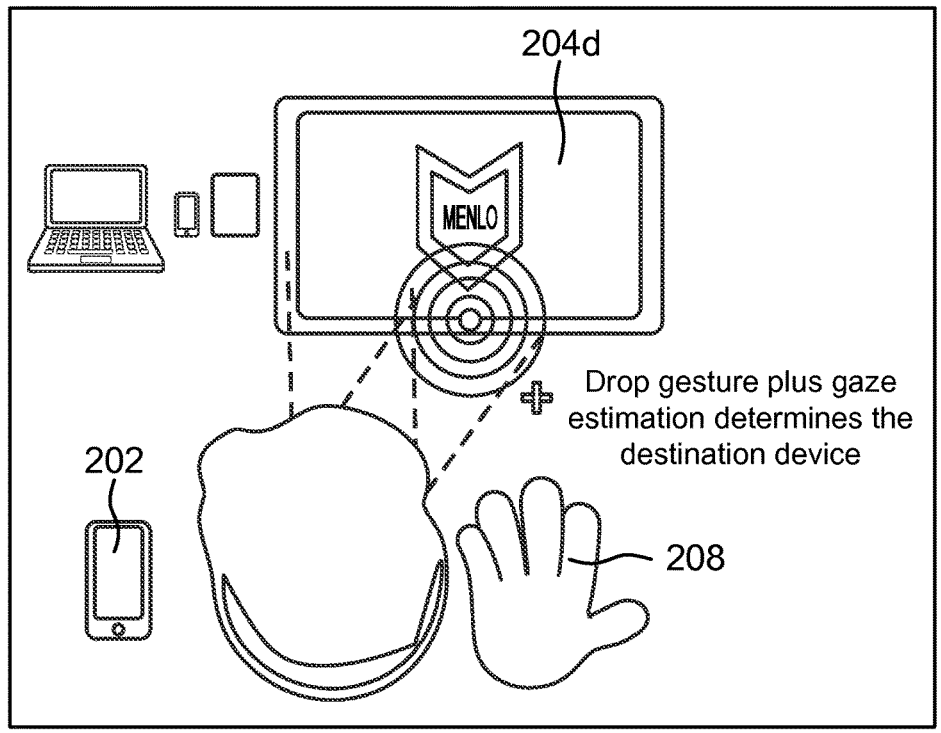

In FIG. 2d, user 206 may perform a catch or "drop" gesture 208, for example, opens his hand, towards a desired target device, for example, towards secondary device 204d (a TV). The target device recognizes the gesture (e.g., open hand) and transmits to the parent device 202 that it is now the target device.

Alternatively, devices may also use gaze estimation (e.g., face direction and/or a direction in which a user's eyes are looking) in conjunction with gesture detection to confirm the user is targeting that device. This may reduce errors for devices in close proximity. In this example, user 206 may direct his or her face and/or gaze towards device 204d to indicate that device 204d is being targeted.

The target device may or may not give feedback to the user that the drop has been received. If feedback is given, the feedback may be in any form, for example, a sound, a flash of the screen, an animation such as a visual growing of the content to be displayed, a vibration, a text note, or any other appropriate form.

The rest of the devices (e.g., secondary devices 204a-c) may be informed, by either the parent device or the target device, to quit gesture recognition mode or that they will not be the recipient of transfer content. Alternatively, the rest of the devices (e.g., secondary devices 204a-c) may continue to look for gestures, for example for a time "t" or until a timeout. Or, in another embodiment, the rest of the devices (e.g., secondary devices 204a-c) may detect a cancel gesture to deactivate the gesture recognition mode.

In this embodiment, catch or "drop" gesture 208 may be in the form of an open hand; however, catch gestures may be in any appropriate form. Gestures may vary per application, location, targeted user or device, content, etc. In addition, gestures may be pairs of varying gestures. A "secret handshake" may allow for a line of sight or knowledge-based human encryption. In an embodiment, a device may capture a "secret handshake" or gesture belonging to a particular user where the particular user may be determined by facial or voice recognition.

Finally, the content may be presented on the target device (e.g., secondary device 204d (TV)). In embodiments where the content is time-line based, the content may start playing at the time-stamp where it was paused on the parent device. Alternatively, the content may begin at a time "t" before the pause, where "t" may be a short duration, for example about 2 to 5 seconds, or where "t" represents a natural break in content (e.g., the beginning of a scene, sentence, stanza, etc.). Those of skill in the art will appreciate that "t" is used herein to denote a certain time or a period of time, and that not all references to "t" herein necessarily refer to the same time or period of time. Thus, the value of "t" described herein may vary.

There are many circumstances in which embodiments of the present disclosure may be utilized. For example, in a connected home environment, a user device (e.g., a smart phone, tablet, laptop, etc.) may detect a gesture from a user to transfer content such as a recipe displayed on the user device to a target device such as an oven, which may then automatically pre-heat to a correct temperature. In another example, in a healthcare setting, a user device may detect a gesture from a user such as a doctor to transfer instructions from the doctor's user device to a target device such as an IV, which may then administer a proper amount of medicine, or to another user device, for example, a patient's user device or a larger screen, for sharing or displaying information or files such as X-rays between the user devices.

Figure 3:
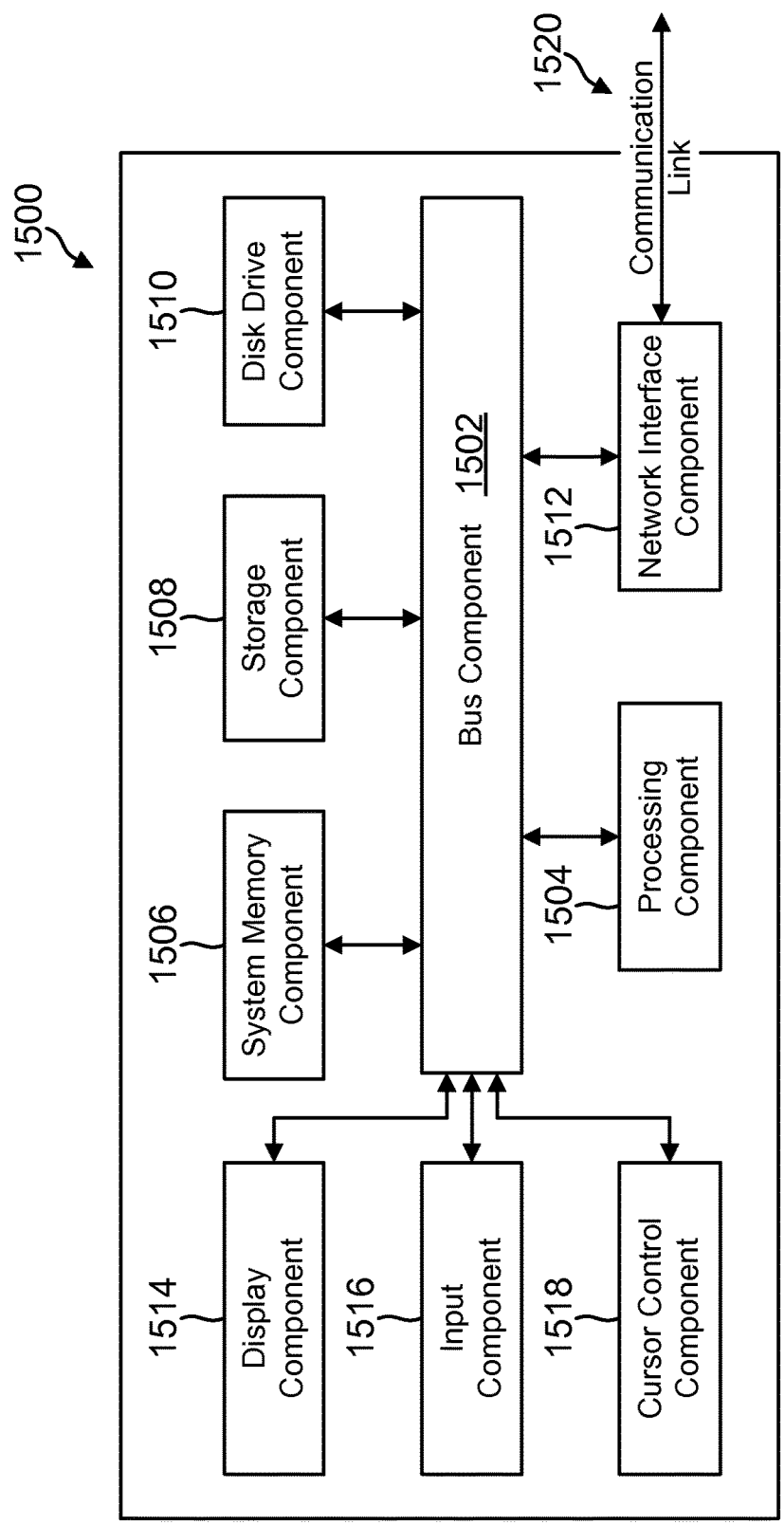
FIG. 3 illustrates a block diagram of a system for implementing a device according to an embodiment of the present disclosure.

Referring now to FIG. 3, a block diagram of a system for implementing a device is illustrated according to an embodiment of the present disclosure. The system 1500 may be used to implement any type of device including wired or wireless devices such as a mobile device, a smart phone, a Personal Digital Assistant (PDA), a tablet, a laptop, a personal computer, a TV, or the like.

System 1500 illustrated in FIG. 3 may be suitable for implementing embodiments of the present disclosure, including parent devices 102, 202, 111 and 121, and one or more receiving or secondary devices 104a-104c, 112, 122, 204a-204c. System 1500, such as part of a device, e.g., smart phone, tablet, personal computer and/or a network server, includes a bus 1502 or other communication mechanism for communicating information, which interconnects subsystems and components, including one or more of a processing component 1504 (e.g., processor, micro-controller, digital signal processor (DSP), etc.), a system memory component 1506 (e.g., RAM), a static storage component 1508 (e.g., ROM), a network interface component 1512, a display component 1514 (or alternatively, an interface to an external display), an input component 1516 (e.g., keypad or keyboard), and a cursor control component 1518 (e.g., a mouse pad). In various embodiments, the input component 1516 may include a gesture recognition component or module that may include technologies such as a camera, IR, or an ultrasound input.

In accordance with embodiments of the present disclosure, system 1500 performs specific operations by processing component 1504 executing one or more sequences of one or more instructions contained in system memory component 1506. Such instructions may be read into system memory component 1506 from another computer readable medium, such as static storage component 1508. These may include instructions to send messages, or receive messages, based on gesture recognition technologies, etc. In other embodiments, hard-wired circuitry may be used in place of or in combination with software instructions for implementation of one or more embodiments of the disclosure.

In various embodiments, processing component 1504 may execute one or more sequences of one or more instructions, which may be included in an application configured to detect gestures, for example, gestures associated with various actions such as transferring content, (e.g., gestures corresponding to initiating or completing content transfer). In an embodiment, the instructions may be configured to cause processing component 1504 to capture content that is to be transferred, for example, in a display buffer, a screen shot, or data from the application. The instructions may be initiated by or executed by an application or service or background process. In some embodiments, the transfer initiation may be started by a background service or task implemented in the HLOS (high-level operating system), which may run independent of any application, user interface, or visible windows. In such embodiments, it may be possible to utilize embodiments described herein regardless of which application is running in a foreground. Thus, rather than being dependent on an application recognizing a gesture and potentially being limited in types and amounts of data to share, implementation in a service and/or HLOS may allow a user to share any displayed content in some embodiments, for example by transmitting an image or video buffer. In some embodiments, information other than media, images, etc. are transmitted between devices. For example, files or applications or other information may be shared pursuant to embodiments described herein.

Logic may be encoded in a computer readable medium, which may refer to any medium that participates in providing instructions to processing component 1504 for execution. Such a medium may take many forms, including but not limited to, non-volatile media, volatile media, and transmission media. In various implementations, volatile media includes dynamic memory, such as system memory component 1506, and transmission media includes coaxial cables, copper wire, and fiber optics, including wires that comprise bus 1502. Memory may be used to store representations of different options for gesture recognition. In an example, specific hand poses (or other appropriate poses) may be stored in connection with specific actions such as an open hand pose may represent a "grab" gesture for moving content. In an embodiment, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read. The computer readable medium may be non-transitory.

In various embodiments of the disclosure, execution of instruction sequences to practice the disclosure may be performed by system 1500. In various other embodiments, a plurality of systems 1500 coupled by communication link 1520 (e.g., WiFi, or various other wired or wireless networks) may perform instruction sequences to practice the disclosure in coordination with one another. System 1500 may transmit and receive messages, data, information and instructions, including one or more programs (i.e., application code) through communication link 1520 and network interface component 1512. Received program code may be executed by processing component 1504 as received and/or stored in disk drive component 1510 or some other non-volatile storage component for execution.

Figure 4:
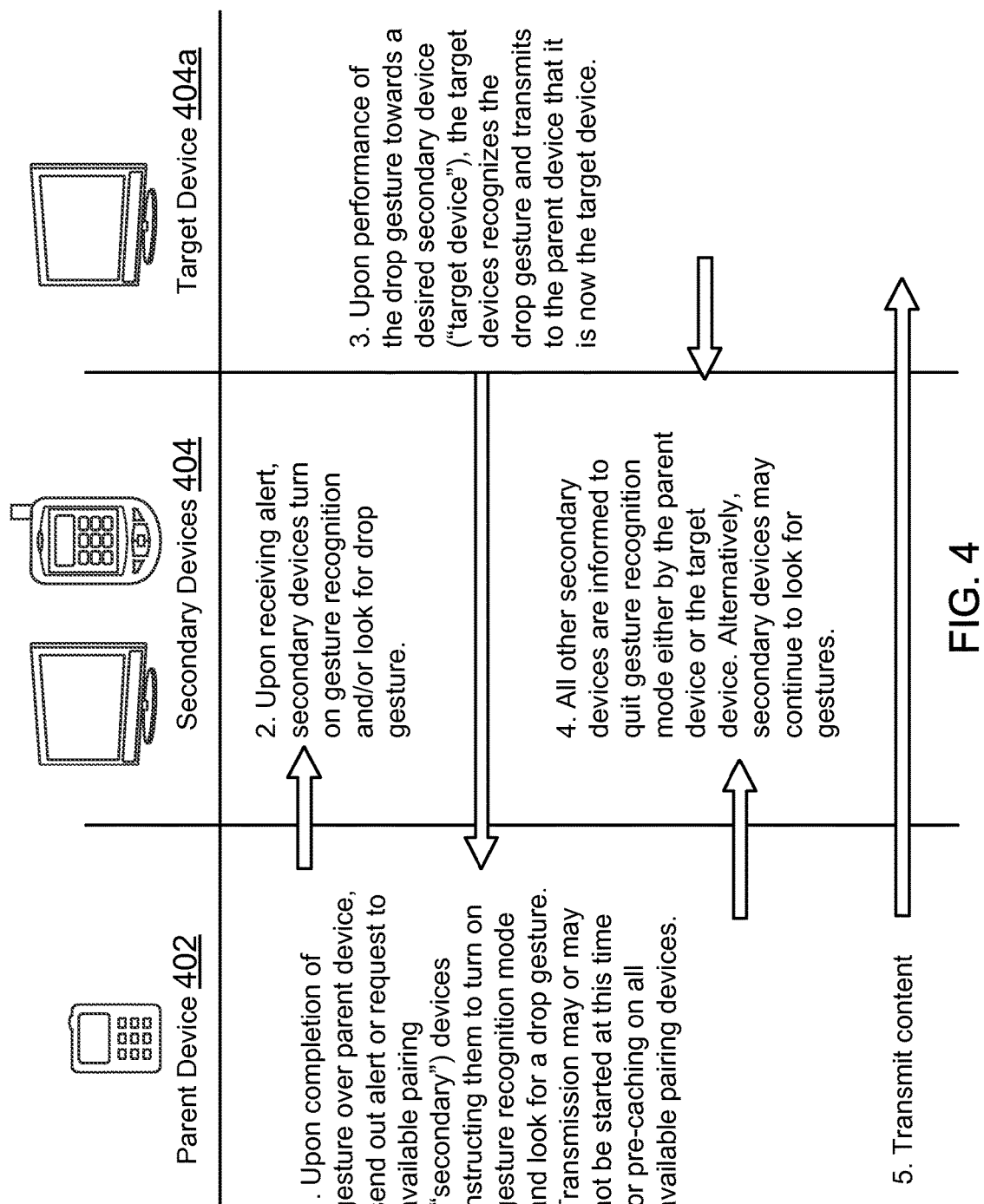
FIG. 4 illustrates a message flow diagram according to an embodiment of the present disclosure.

FIG. 4 illustrates a message flow diagram according to an embodiment of the present disclosure. As described above, messages may flow from one device to another, for example from a parent device 402 to one or more secondary devices 404 and vice versa, or between secondary devices 404. Such messages may be generated or transmitted at certain times or upon particular events or triggers (e.g. after a content transfer gesture is detected). In that regard, a device may initiate gesture recognition capabilities, for example, a device's image or video capturing capabilities (e.g., camera) in response to getting a message that an action is to be implemented, for example, that a transfer of content may occur. As described above, connections between devices may be made with WiFi direct, AllJoyn, WiFi display or any other sharing or pairing connection. Any of the parent device 402 and/or secondary devices 404 may be implemented by the system 1500 in some embodiments, and/or elements of the system 1500 may be incorporated into any of the parent device 402 and/or secondary devices 404, for example.

Referring to the message flow illustrated in the embodiment of FIG. 4, first, upon completion of a gesture over a parent device 402, a request or alert may be sent out (for example, using network interface component 1512 and/or communication link 1520) to available pairing secondary devices 404 instructing them to turn on gesture recognition mode or alter a gesture recognition mode, for example, and look for a "drop" gesture. The action, for example, content movement, may or may not start transmission from parent device 402 at this time for pre-caching on all pairable secondary devices 404.

Transmission may be made to any or all available secondary devices 404, for example by broadcasting the request or alert from the parent device 402. In various embodiments, transmission or broadcasting may be made to all available devices or to a subset thereof. For example, the alert may be transmitted only to devices in a certain group (e.g., to friends according to a social network, according to a user of the device (e.g., Bobby's devices, or mom's devices), etc.). The secondary devices 404 to which the alert or request is transmitted may also be determined or selected based on the transfer initiation gesture. For example, different devices may be alerted for different initiation gestures. In some embodiments, a flick gesture may be for targeting one set of devices, while a "grab" may be for targeting another set of devices, etc.

In that regard, available devices may be selected in various manners. For example, one or more target devices 404a may be selected based on: a) devices within line-of-sight, which may be determined, for example, by detecting a signal (e.g., an optical signal); b) devices within a relative distance or relative position, which may be determined, for example, by measuring a device-to-device distance or estimated by time-of-flight or signal strength (e.g., optical, radio, or acoustic signal); c) devices within the same location (e.g. a room) or within a distance, for example using an indoor positioning system (IPS) to determine a position of devices relative to a room, landmark, or fixed node. Also, positions may be compared to determine a relative distance or relative position, or positions may be compared to a reference (map) to determine the room each device is in; and/or d) devices connected through the same communication hub, repeater, router, etc. Such operations, determinations, and/or selections may be performed by at least the processing component 1504, for example.

When a user of parent device 402 wants to initiate an action, for example, to move desired content from parent device 402 to one or more secondary devices 404, the user may initiate a gesture such as a "grab" gesture, e.g., with an open hand pose, and complete the gesture (e.g., "grab" gesture) with a closed hand pose. The completion of the gesture may initiate the action (e.g., move sequence). The initiation of the action, e.g., move sequence, may commence when the "grab" gesture, e.g., open hand pose, is held for a specified period of time "t", e.g., about 1-3 seconds. The gesture may be detected or received by the input component 1516, for example. Parent device 402 may or may not give feedback to the user that the action has been initiated, for example with display component 1514 and/or another component.

In embodiments where the action includes movement of content that is time-line based or streaming content (e.g., video, music, etc.), the content may be paused on parent device 402 and a time stamp of the pause may be included in the transmission data.

Secondary devices 404 may turn on gesture recognition and/or look for a drop gesture upon receiving the alert from parent device 402. In various embodiments, gesture recognition (e.g., via a camera) may already be on or is always on. Thus, the message to a secondary device 404 may not necessarily cause gesture recognition to start or to initiate (although gesture recognition may be turned on or started in some embodiments). For example, the message to a secondary device 404 may simply alert the secondary device 404 what the initiation gesture was or what corresponding completion gesture is desired. In an embodiment, the message may change the duty cycle of the gesture recognition (e.g., to attempt to detect a gesture at higher frame rate), or may alter the performance of gesture recognition (e.g., by adjusting threshold levels in a gesture recognition algorithm or by allowing the recognition module to determine a model to use to find a particular pose, object, or movement).

A device's gesture recognition system (which may be a part of input component 1516 illustrated in the embodiment of FIG. 3 in some embodiments) may have a set of gestures that it may recognize in some embodiments, which may be referred to as a "gesture alphabet". Instead of turning on or off a gesture recognition system, if that gesture recognition system is already on then a gesture may be added or removed from the gesture alphabet. For example, a camera may have an always on gesture recognition system to detect a "take photo" gesture, and a "grab" or "drop" gesture may be added to the gesture alphabet.

Referring again to FIG. 4, upon performance of the drop gesture towards a desired secondary device ("target device") 404*a*, target device 404*a* recognizes the drop gesture (for example, using an input component 1516) and transmits to parent device 402 that it is now the target device (for example using a network interface component 1512 and/or communication link 1520).

In this regard, a user may perform the drop gesture (e.g., with an open hand pose) towards desired target device 404*a*. In some embodiments, gaze estimation (e.g., face direction and/or a direction in which a user's eyes are looking) may be used in conjunction with gesture detection to confirm the user is targeting that device. This may reduce errors in devices in close proximity. For example, the target device 404*a* may detect that it is the target device only when it detects the transmission completion gesture and identifies that a user is looking at it in some embodiments.

In embodiments where parent device 402 uses a gesture key code for simultaneous multi device sharing (for example, a secret handshake, a secret hand pose, a specific hand pose for a specific secondary device (e.g., flick of two fingers for one secondary device, flick of three fingers for another secondary device, etc.)), target device 404*a* may transmit to parent device 402 that it is now the target device when the target device 404*a* recognizes the specific hand pose, or uses a partner to a secret gesture key code only known to the target device, for example.

The target device may or may not give feedback to the user that the drop has been received, for example with a display component 1514 or another component, for example a component that produces audio.

Upon recognition of the target device, all other secondary devices may be informed to quit gesture recognition mode either by the parent device or the target device in some embodiments. Alternatively, when a user performs the "drop" gesture towards the target device 404*a*, the rest of the secondary devices may continue to look for gestures. In an embodiment, the rest of the secondary devices may continue to look for gestures for a time "t" or until a timeout. Or, in another embodiment, the rest of the secondary devices may detect a cancel gesture to deactivate the gesture recognition mode. In some embodiments, the parent device is configured to detect a cancel gesture and notify the secondary devices to stop monitoring for gestures. In other embodiments, the parent device may after some time "t" or until a timeout when no secondary device has detected a gesture, notify all secondary devices to stop looking for gestures. The gestures may vary per application, location, targeted user, etc., and may be pairs of varying gestures. Secret hand poses such as secret handshakes may be used and allow for a line of sight or knowledge based human encryption.

Thereafter, content may be transmitted to target device 404*a* (for example, when the content was not transferred initially for caching). The content may be processed by the target device 404*a* after reception.

Content may be presented on the target device, or some other form of processing may be performed with respect to the content. In an embodiment where content was pre-cached, the pre-cached content may be displayed on the target device 404*a* once the target device 404*a* detects the transfer completion gesture, alerts the parent device 402 of the detection, and/or receives confirmation from the parent device 402.

In embodiments where the content is time-line based, the content may start playing at the time-stamp where it was paused on the parent device. Alternatively, the content may start playing at a time "t" before the pause, where "t" may be a short duration (e.g., about 2 to 5 seconds), or "t" may represent a natural break in content such as the beginning of a scene, a sentence, a stanza, or the like.

In the embodiment described above with respect to FIG. 4, various sequences of operations are described. For example, the target device 404*a* may process received content or initiate a content transfer in some embodiments only when an alert from the parent device 402 is received and a transfer completion gesture is thereafter detected. Such sequence of operations, however, is not required in all embodiments.

For example, content transfer or transmission may occur in some embodiments if two (or more) devices detect the same (or a corresponding) gesture at roughly the same time (or within a threshold amount of time). Determination of whether a corresponding gesture was detected at approximately the same time may be performed, for example, at a parent device 402 described above, a target device 404*a* described above, and/or at a server or AP communicating with both (or more) devices. For example, when a first device detects a share gesture, it may broadcast a message. When a second device detects a receive gesture, it may listen for a message indicating that another device detected a corresponding share gesture and/or transmit a message of its own indicating a receive gesture was detected. The messages may be timestamped or include a time at which a gesture was detected, for example. If the share gesture was detected at roughly the same time as the receive gesture (for example as determined by the first device, second device, and/or a server based on message(s) from the first device and/or second device), content may be transferred.

Figure 5:
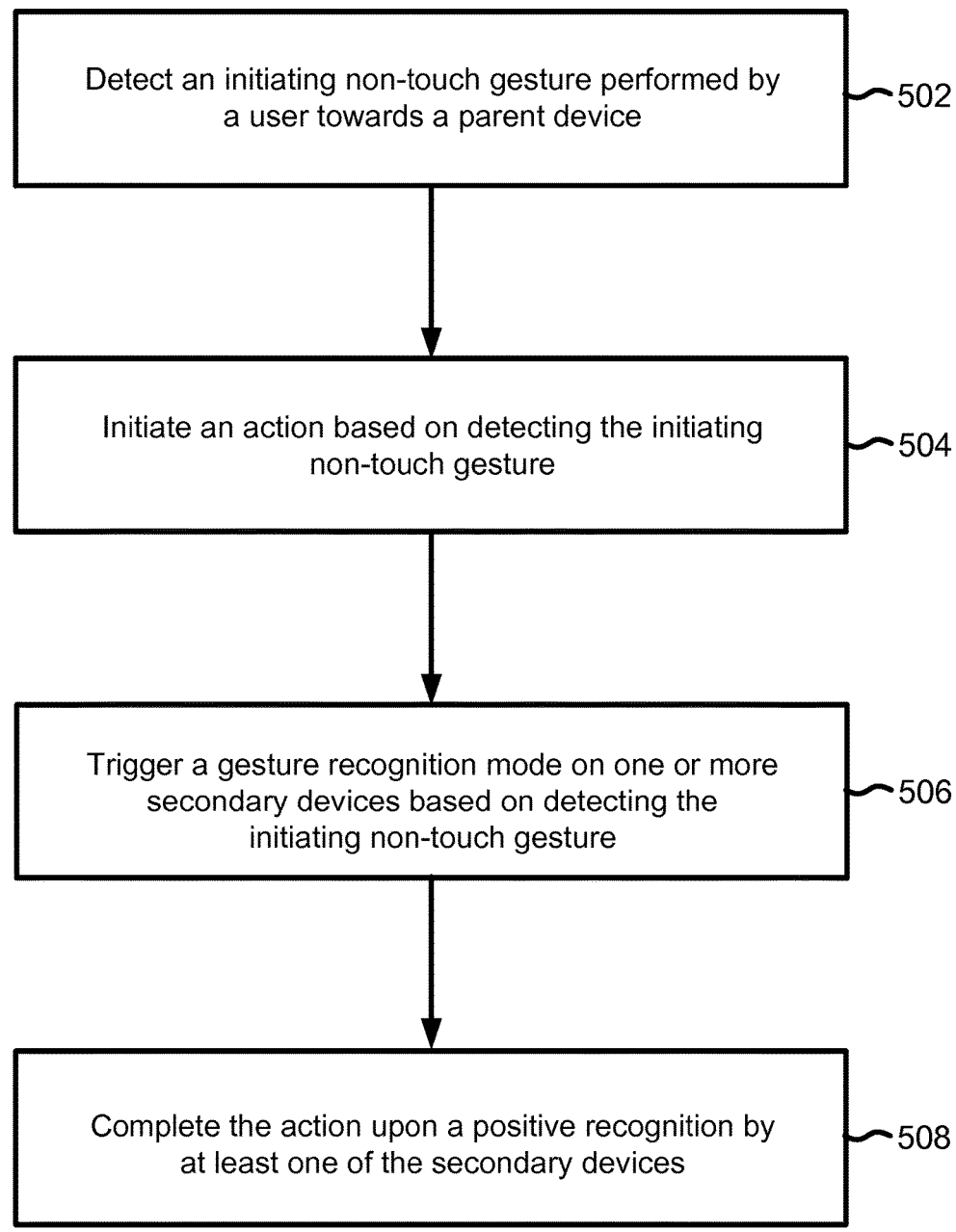
FIG. 5 is a flow diagram illustrating a method for multi device pairing and sharing according to an embodiment of the present disclosure.

FIG. 5 is a flow diagram illustrating a method for multi device pairing and sharing according to an embodiment of the present disclosure. It should be appreciated that the method illustrated in FIG. 5 may be implemented by the device illustrated in FIG. 3 according to one or more embodiments.

In block 502, a parent device, for example a device implementing system 1500 illustrated in the embodiment of FIG. 3, may detect an initiating non-touch gesture performed by a user towards the parent device. The device may generally detect non-touch gestures via input component 1516. The initiating non-touch gesture may include, for example, a grab gesture and a completing of the grab gesture by the user such that the completion of the grab gesture may initiate an action such as moving content from the parent device to one or more secondary devices.

In block 504, the parent device, via processing component 1504, may initiate the action (e.g., start moving content) based on detecting the initiating non-touch gesture performed by the user as described above according to one or more embodiments.

In block 506, the parent device may trigger a gesture recognition mode on one or more secondary devices based on detecting the initiating non-touch gesture. For example, the parent device may send a message via an applicable communication protocol over network interface component 1512 and/or communication link 1520 to alert all secondary devices available for pairing to enable gesture recognition to detect a corresponding gesture, e.g., to look for detection of a "drop" gesture.

In block 508, the parent device may complete the action, for example, transfer content, upon a positive recognition by at least one of the secondary devices. In an embodiment, the parent device may receive a message that a target device has been identified such that processing component 1504 may complete transferring of the content to the target device via an applicable communication protocol over network interface component 1512 and/or communication link 1520.

Figure 6:
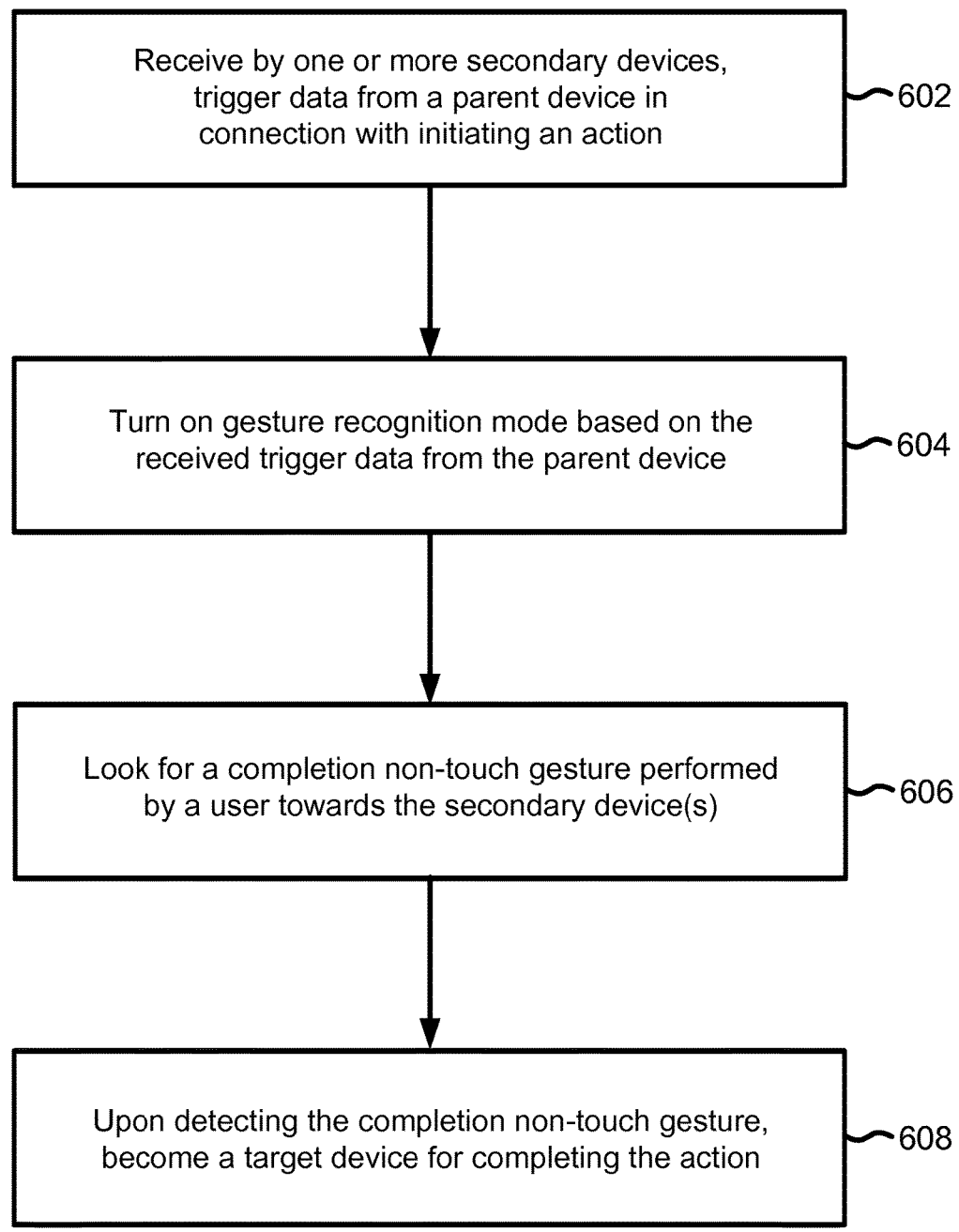
FIG. 6 is a flow diagram illustrating a method for multi device pairing and sharing according to another embodiment of the present disclosure.

FIG. 6 is a flow diagram illustrating a method for multi device pairing and sharing according to another embodiment of the present disclosure. It should be appreciated that the method illustrated in FIG. 6 may be implemented by the device illustrated in FIG. 3 according to one or more embodiments.

In block 602, one or more secondary devices, for example devices that are available for pairing, and which may be implemented by system 1500 illustrated in FIG. 3, may receive trigger data from a parent device in connection with initiating an action, for example, when content is to be transferred from a parent device to a secondary device over network interface component 1512 and/or communication link 1520.

In block 604, the secondary device(s) may turn on gesture recognition mode based on the received trigger data from the parent device. That is, a secondary device may be alerted that an action may occur by the received data from the parent device. Gesture recognition mode may be implemented by input component 1516.

In block 606, the secondary device(s) may look for a completion non-touch gesture performed by a user towards the secondary device(s). In this regard, the secondary device (s) may have non-touch gesture capabilities via input component 1516 such that the secondary device(s) may detect non-touch completion gestures such as a "drop" gesture performed by a user.

In block 608, upon detecting the completion non-touch gesture, e.g., a "drop" gesture via input component 1516, the secondary device(s) may become a target device for completing the action. In that regard, an action such as receiving content from a parent device may be completed wherein the content may be received over network interface component 1512 and/or communication link 1520.

Figure 7:
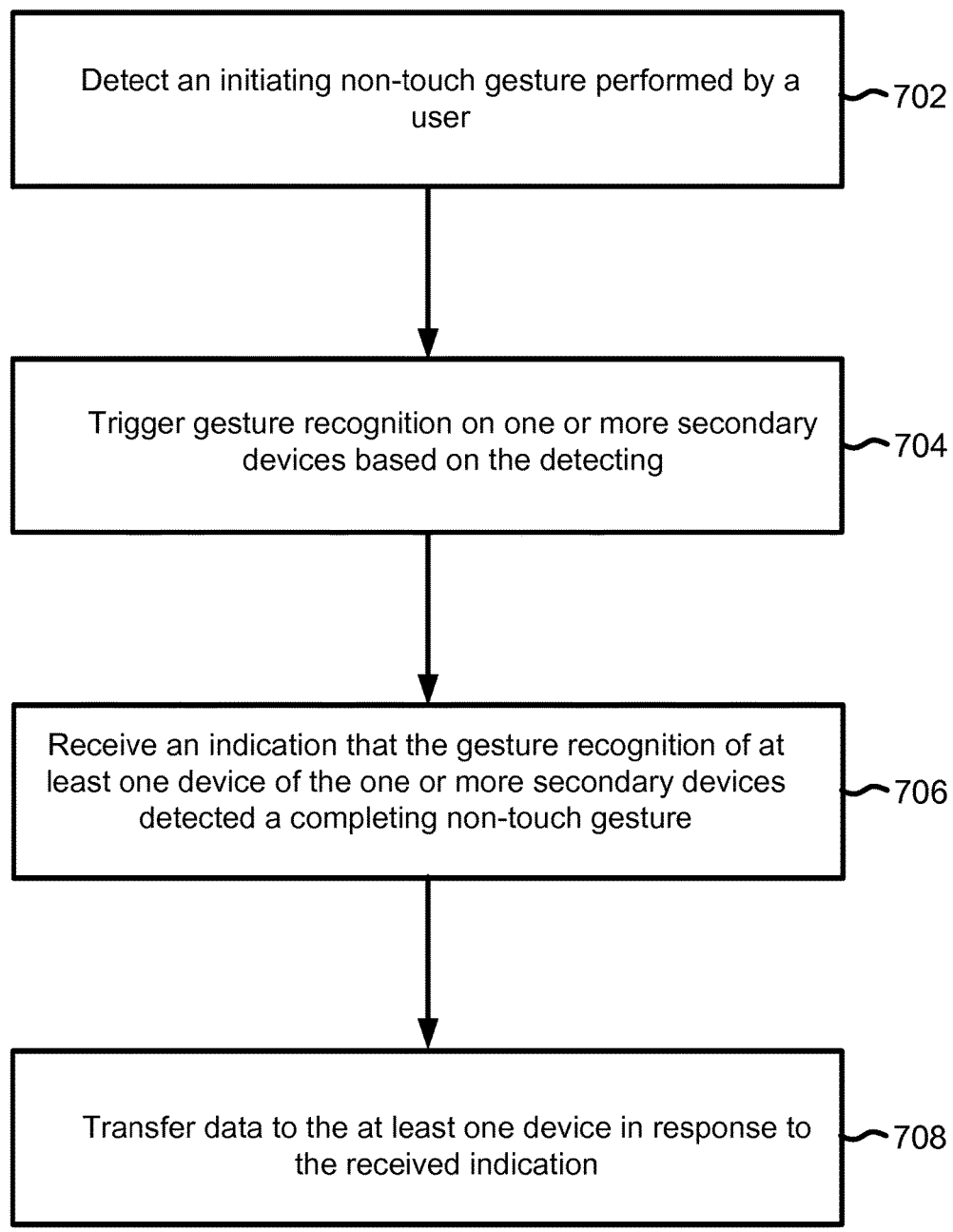
FIG. 7 is a flow diagram illustrating a method for transferring data.

FIG. 7 is a flow diagram illustrating a method for transferring data according to an embodiment of the present disclosure. It should be appreciated that the method illustrated in FIG. 7 may be implemented by the device illustrated in FIG. 3 according to one or more embodiments.

In block 702, a parent device, for example a device implementing system 1500 illustrated in the embodiment of FIG. 3, may detect an initiating non-touch gesture performed by a user. The device may generally detect non-touch gestures via input component 1516. The initiating non-touch gesture may include, for example, a grab gesture and a completing of the grab gesture by the user such that the completion of the grab gesture may initiate an action such as moving content from the parent device to one or more secondary devices.

In block 704, the parent device may trigger gesture recognition on one or more secondary devices based on detecting the initiating non-touch gesture. For example, the parent device may send a message via an applicable communication protocol over network interface component 1512 and/or communication link 1520 to alert all secondary devices available for pairing to enable gesture recognition to detect a corresponding gesture, e.g., to look for detection of a "drop" gesture.

In block 706, the parent device may receive an indication that the gesture recognition of at least one device of the one or more secondary devices detected a completing non-touch gesture. For example, the parent device may receive a message via an applicable communication protocol over network interface component 1512 and/or communication link 1520. The completing non-touch gesture may correspond to the initiating non-touch gesture; for example the completing non-touch gesture may comprise a "drop" gesture as described above.

In block 508, the parent device may transfer data to the at least one device in response to the received notification. In an embodiment, the parent device may determine a target device has been identified based on the indicator received at 706 such that processing component 1504 may complete transferring of the data to the target device via an applicable communication protocol over network interface component 1512 and/or communication link 1520.

Figure 8:
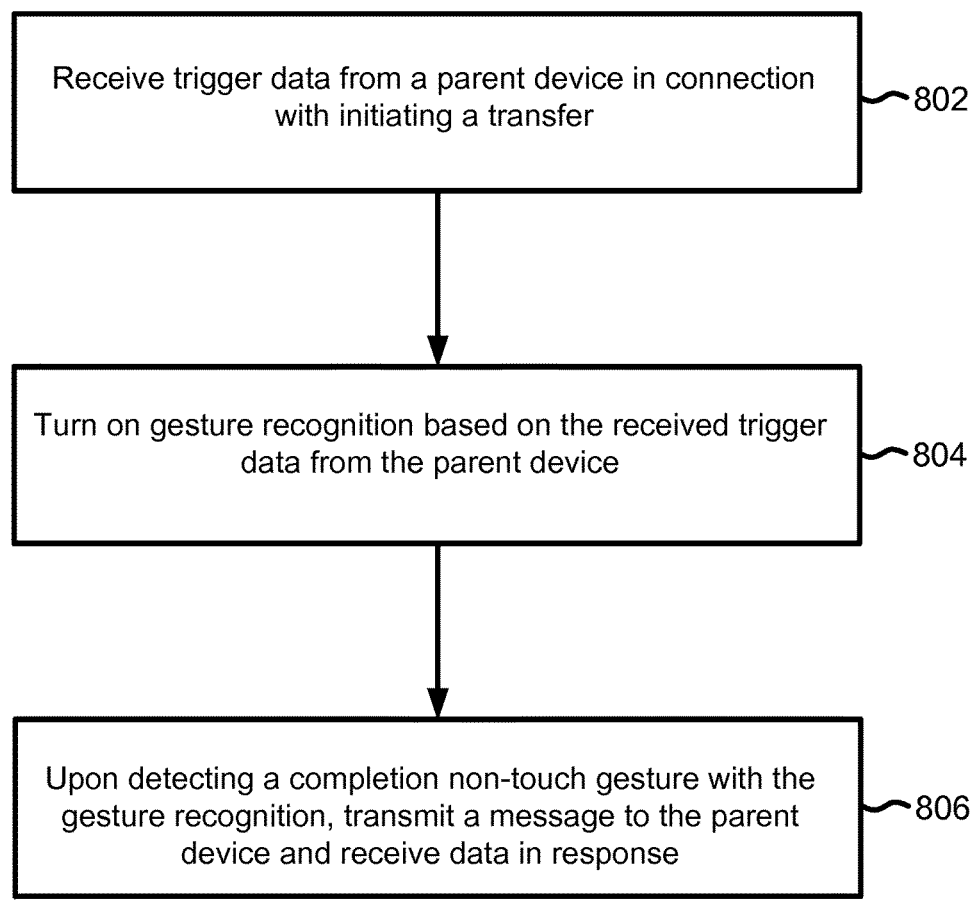
FIG. 8 is a flow diagram illustrating a method for receiving data.

FIG. 8 is a flow diagram illustrating a method for receiving data. It should be appreciated that the method illustrated in FIG. 8 may be implemented by the device illustrated in FIG. 3 according to one or more embodiments.

In block 802, one or more secondary devices, for example devices that are available for pairing, and which may be implemented by system 1500 illustrated in FIG. 3, may receive trigger data from a parent device in connection with initiating a transfer, for example, when content is to be transferred from a parent device to a secondary device over network interface component 1512 and/or communication link 1520.

In block 804, the secondary device may turn on gesture recognition based on the received trigger data from the parent device. That is, the secondary device may be alerted that an action may occur by the received data from the parent device. Gesture recognition and/or a gesture recognition module may be implemented by input component 1516 and/or processing component 1504.

In block 806, upon detecting the completion non-touch gesture, e.g., a "drop" gesture via input component 1516, the secondary device may become a target device for completing the transfer. In that regard, the secondary device may receive data from a parent device, for example over network interface component 1512 and/or communication link 1520.

Advantageously, devices according to one or more embodiments of the present disclosure may include non-touch gesture recognition technologies. Non-touch gesture recognition or detection may be beneficial in many scenarios including, for example: it is nonintrusive, detection may be silent in some embodiments, it is useful when touch is not practical, it increases immersive user experiences and usability for some tasks, it is useful for elderly users, users with disabilities, or users who do not want or cannot touch a device, its related hardware may be commercially available at low cost, non-touch gestures may be more natural than other input techniques, and/or the size of an interaction area may be increased. Also, certain embodiments may be used to implement actions such as transfer content or share information with one or more devices that traditionally lack a user interface such as a screen, for example, a speaker, a printer, an oven, some medical equipment, etc. Furthermore, turning on gesture recognition capabilities such as a camera of a user device or raising a duty cycle in response to a transfer initiation message may save power. Further, alerting a device of an upcoming transfer may allow more accurate non-touch gesture detection because a target device may not attempt to interpret random movements of a user until the target device has been alerted or knows to expect an action, e.g., that it should be looking for a transfer. Embodiments of the present disclosure may also be advantageous in many other situations, for example, where a handshake is used between a parent device and a secondary device, two users that are in view of each other may see the actions of each other so they may be able to determine the next or corresponding gesture.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for transferring data, the method comprising:
   detecting, by a parent device, an initiating non-touch gesture physically performed by a user extremity towards the parent device;
   triggering, by the parent device, non-touch gesture recognition on one or more secondary devices based on the detecting;
   receiving an indication at the parent device that the non-touch gesture recognition of at least one device of the one or more secondary devices detected a completing non-touch gesture physically performed by the user extremity, the completing non-touch gesture pre-associated with the initiating non-touch gesture;
   upon the detection of the completing non-touch gesture by the at least one device of the one or more secondary devices, sending a non-touch gesture recognition deactivation message to other secondary devices to deactivate non-touch gesture recognition on the other secondary devices; and
   transferring data from the parent device to the at least one device in response to the received indication.

2. The method of claim 1, wherein the initiating non-touch gesture comprises a grab gesture.

3. The method of claim 1, further comprising providing feedback, by the parent device, that the initiating non-touch gesture was detected.

4. The method of claim 3, wherein the feedback further comprises at least one of a sound, a flash on an interface of the parent device, an animation, a vibration and a text note.

5. The method of claim 1, wherein the triggering of non-touch gesture recognition on the one or more secondary devices further comprises transmitting a request to the one or more secondary devices to turn on the gesture recognition.

6. The method of claim 5, wherein the transmitting comprises transmitting information indicative of the initiating non-touch gesture.

7. The method of claim 1, wherein the detecting the initiating non-touch gesture further comprises detecting at least a portion of a key code.

8. The method of claim 7, further comprising verifying that the completing non-touch gesture comprises at least a portion of the key code prior to the transferring.

9. The method of claim 8, wherein the initiating non-touch gesture and the completing non-touch gesture are dynamic.

10. The method of claim 7, wherein the key code comprises a different completing gesture for each of the one of the secondary devices.

11. The method of claim 1, further comprising using facial recognition technology to recognize the user of the parent device before the detecting the initiating non-touch gesture.

12. The method of claim 1, wherein the transferring comprises moving time-line based content, the method further comprising:
    pausing the time-line based content at the parent device upon detecting completion of the initiating non-touch gesture; and
    sending indicator data indicating a progress of the time-line based content.

13. The method of claim 12, wherein sending the indicator data further comprises sending a time stamp indicating where the parent device paused the time-line based content.

14. The method of claim 12, further comprising de-multiplexing the content into a plurality of data streams, wherein the time-line based content comprises a plurality of data streams.

15. The method of claim 14, further comprising selecting a subset of the plurality of streams to transfer based on one or more capabilities of at least one device.

16. A device, comprising:
    a sensor configured to detect an initiating non-touch gesture physically performed by a user extremity towards the device; and
    a transceiver configured to trigger non-touch gesture recognition on one or more secondary devices based on a gesture detected by the sensor, receive an indication that the non-touch gesture recognition of at least one device of the one or more secondary devices detected a completing non-touch gesture physically performed by the user extremity, the completing non-touch gesture pre-associated with the initiating non-touch gesture, send a non-touch gesture recognition deactivation message to other secondary devices to deactivate non-touch gesture recognition on the other secondary devices upon the detection of the completing non-touch gesture by the at least one device of the one or more secondary devices; and transfer data to the at least one device in response to the received indication.

17. The device of claim 16, wherein the initiating non-touch gesture comprises a grab gesture.

18. The device of claim 16, further comprising an output device configured to provide feedback that the initiating non-touch gesture was detected.

19. The device of claim 18, wherein the feedback further comprises at least one of a sound, a flash on an interface of the parent device, an animation, a vibration and a text note.

20. The device of claim 16, wherein the transceiver is configured to trigger non-touch gesture recognition on the one or more secondary devices by transmitting a request to the one or more secondary devices to turn on the gesture recognition.

21. The device of claim 20, wherein the transmitting comprises transmitting information indicative of the initiating non-touch gesture.

22. The device of claim 16, wherein the non-touch gesture comprises at least a portion of a key code.

23. The device of claim 22, further comprising a processor configured to verify that the completing non-touch gesture comprises at least a portion of the key code prior to the transceiver transferring the data.

24. The device of claim 23, wherein the initiating non-touch gesture and the completing non-touch gesture are dynamic.

25. The device of claim 22, wherein the key code comprises a different completing gesture for each of the one of the secondary devices.

26. The device of claim 16, further comprising a processor configured to use facial recognition technology to recognize the user of the device before the detecting the initiating non-touch gesture.

27. The device of claim 16, wherein the transferring comprises moving time-line based content, the moving comprising:
pausing the time-line based content at the device upon detecting completion of the initiating non-touch gesture; and
sending indicator data indicating a progress of the time-line based content.

28. The device of claim 27, wherein sending the indicator data further comprises sending a time stamp indicating where the parent device paused the time-line based content.

29. The device of claim 27, further comprising a de-multiplexer configured to de-multiplex the content into a plurality of data streams, wherein the time-line based content comprises a plurality of data streams.

30. The device of claim 29, further comprising a processor configured to select a subset of the plurality of streams to transfer based on one or more capabilities of at least one device.

31. An apparatus, comprising:
means for detecting, by a parent device, an initiating non-touch gesture physically performed by a user extremity towards the parent device;
means for triggering, by the parent device, non-touch gesture recognition on one or more secondary devices based on the detecting;
means for receiving an indication at the parent device that the non-touch gesture recognition of at least one device of the one or more secondary devices detected a completing non-touch gesture physically performed by the user extremity, the completing non-touch gesture pre-associated with the initiating non-touch gesture;
means for, upon the detection of the completing non-touch gesture by the at least one device of the one or more secondary devices, sending a non-touch gesture recognition deactivation message to other secondary devices to deactivate non-touch gesture recognition on the other secondary devices; and
means for transferring data from the parent device to the at least one device in response to the received indication.

32. A non-transitory computer readable medium on which are stored computer readable instructions which, when executed by a processor, cause the processor to:
detect, by a parent device, an initiating non-touch gesture physically performed by a user extremity towards the parent device;
trigger, by the parent device, non-touch gesture recognition on one or more secondary devices based on the detecting;
receive an indication at the parent device that the non-touch gesture recognition of at least one device of the one or more secondary devices detected a completing non-touch gesture physically performed by the user extremity, the completing non-touch gesture pre-associated with the initiating non-touch gesture;
upon the detection of the completing non-touch gesture by the at least one device of the one or more secondary devices, send a non-touch gesture recognition deactivation message to other secondary devices to deactivate non-touch gesture recognition on the other secondary devices; and
transfer data from the parent device to the at least one device in response to the received indication.

33. A method for receiving data, the method comprising:
receiving, by a secondary device, trigger data from a parent device in connection with initiating a transfer;
turning on non-touch gesture recognition by the secondary device based on the received trigger data from the parent device; and
upon detecting a completion non-touch gesture physically performed by a user extremity with the non-touch gesture recognition, the completion non-touch gesture pre-associated with an initiating non-touch gesture physically performed by the user extremity at the parent device, sending a non-touch gesture recognition deactivation message to other secondary devices to deactivate non-touch gesture recognition on the other secondary devices, transmitting a message to the parent device, and receiving data in response.

34. The method of claim 33, wherein detecting the completion non-touch gesture further comprises detecting a drop gesture.

35. The method of claim 33, further comprising: deactivating, by the secondary device, the gesture recognition if the secondary device does not detect the completion non-touch gesture within a threshold time.

36. The method of claim 33, further comprising: deactivating, by the secondary device, the gesture recognition upon detecting a cancel gesture.

37. The method of claim 33, further comprising: continuing to execute the gesture recognition after another device has received the data.

38. The method of claim 33, wherein the detecting the completion non-touch gesture comprises: detecting a pre-defined gesture corresponding to a key code performed at and detected by the parent device.

39. The method of claim 38, wherein the pre-defined gesture and the key code are dynamic.

40. The method of claim 33, wherein the detecting the pre-defined gesture further comprises using facial or voice recognition to identify a particular user.

41. The method of claim 33, wherein the receiving further comprises receiving time-line based content, the method further comprising:
receiving indicator data indicating a progress of the time-line based content; and
starting presentation of the time-line based content based on the received indicator data.

42. The method of claim 41, further comprising starting presentation of the content based on the received indicator data, wherein the indicator data further comprises a time when the time-line based content was paused on the parent device or a specified time before the content was paused.

43. A device, comprising:
a transceiver configured to receive, by a secondary device, trigger data from a parent device in connection with initiating a transfer;
a non-touch gesture recognition module, the non-touch gesture recognition module being selectively triggerable based on the trigger data,
wherein upon detecting a completion non-touch gesture physically performed by a user extremity with the non-touch gesture recognition module, the completion non-touch gesture pre-associated with an initiating non-touch gesture physically performed by the user extremity at the parent device, the transceiver is configured to send a non-touch gesture recognition deactivation message to other secondary devices to deactivate non-touch gesture recognition on the other secondary devices, transmit a message to the parent device, and receive data in response.

44. The device of claim 43, wherein detecting the completion non-touch gesture further comprises detecting a drop gesture.

45. The device of claim 43, wherein the gesture recognition module is deactivated if the completion non-touch gesture is not detected within a threshold time.

46. The device of claim 43, wherein the gesture recognition module is deactivated if a cancel gesture is detected.

47. The device of claim 43, wherein the gesture recognition module is configured to continue to execute gesture recognition after another device has received the data.

48. The device of claim 43, wherein the detecting the completion non-touch gesture comprises:
   detecting a pre-defined gesture corresponding to a key code performed at and detected by the parent device.

49. The device of claim 48, wherein the pre-defined gesture and the key code are dynamic.

50. The device of claim 43, wherein the detecting the pre-defined gesture further comprises using facial or voice recognition to identify a particular user.

51. The device of claim 43, wherein the transceiver is configured to receive time-line based content by:
   receiving indicator data indicating a progress of the time-line based content; and
   starting presentation of the time-line based content based on the received indicator data.

52. The device of claim 51, further comprising a processor configured to start presentation of the content based on the received indicator data, wherein the indicator data further comprises a time when the time-line based content was paused on the parent device or a specified time before the content was paused.

53. An apparatus, comprising:
   means for receiving, by a secondary device, trigger data from a parent device in connection with initiating a transfer;
   means for turning on non-touch gesture recognition by the secondary device based on the received trigger data from the parent device; and
   means for, upon detecting a completion non-touch gesture physically performed by a user extremity with the non-touch gesture recognition, the completion non-touch gesture pre-associated with an initiating non-touch gesture physically performed by the user extremity at the parent device, sending a non-touch gesture recognition deactivation message to other secondary devices to deactivate non-touch gesture recognition on the other secondary devices, transmitting a message to the parent device, and receiving data in response.

54. A non-transitory computer readable medium on which are stored computer readable instructions which, when executed by a processor, cause the processor to:
   receive, by a secondary device, trigger data from a parent device in connection with initiating a transfer;
   turn on non-touch gesture recognition by the secondary device based on the received trigger data from the parent device; and
   upon detecting a completion non-touch gesture physically performed by a user extremity with the non-touch gesture recognition, the completion non-touch gesture pre-associated with an initiating non-touch gesture physically performed by the user extremity at the parent device, send a non-touch gesture recognition deactivation message to other secondary devices to deactivate non-touch gesture recognition on the other secondary devices, transmit a message to the parent device, and receive data in response.

55. The method of claim 1, wherein the user extremity is a hand.

56. The device of claim 16, wherein the user extremity is a hand.

57. The apparatus of claim 31, wherein the user extremity is a hand.

58. The non-transitory computer readable medium of claim 32, wherein the user extremity is a hand.

59. The method of claim 33, wherein the user extremity is a hand.

60. The device of claim 43, wherein the user extremity is a hand.

61. The apparatus of claim 53, wherein the user extremity is a hand.

62. The non-transitory computer readable medium of claim 54, wherein the user extremity is a hand.

* * * * *